United States Patent [19]

Hall

[11] 4,149,516

[45] Apr. 17, 1979

[54] BARBECUE GRILL

[75] Inventor: George W. Hall, Omaha, Nebr.

[73] Assignee: Don Hall Company, Omaha, Nebr.

[21] Appl. No.: 786,628

[22] Filed: Apr. 11, 1977

[51] Int. Cl.² .............................................. A47J 37/00
[52] U.S. Cl. .................................. 126/41 R; 126/9 B; 126/25 R
[58] Field of Search .................... 126/9 R, 9 B, 25 R, 126/25 A, 41 R

[56] References Cited

U.S. PATENT DOCUMENTS

| | | | |
|---|---|---|---|
| 2,419,344 | 4/1947 | Eggleston | 126/25 R |
| 3,191,592 | 6/1965 | Lorbacher | 126/9 R X |
| 3,386,432 | 6/1968 | Hahjoh | 126/41 |
| 3,552,301 | 1/1971 | McNeff | 126/25 R X |
| 3,626,923 | 12/1971 | Martin | 126/41 R |
| 3,785,275 | 1/1974 | Keats et al. | 126/25 R X |
| 3,785,361 | 1/1974 | Mejyr et al. | 126/41 R |
| 3,931,805 | 1/1976 | Nelson | 126/41 R |

Primary Examiner—William F. O'Dea
Assistant Examiner—Harold Joyce
Attorney, Agent, or Firm—Cushman, Darby & Cushman

[57] ABSTRACT

The grill body is an integral member, preferably made of microcrystalline glass and formed with opposed series of corresponding pairs of upwardly opening saddles at each of two different intermediate levels in two opposed sidewalls. Each pair of saddles receives the opposite ends of a metal bar or the like, to provide two levels of support bars. Preferably, the support bars at each level are not interconnected by cross-bars so they may be removed, cleaned and even replaced individually. Particular gas burner and electric heating element constructions are illustrated.

8 Claims, 6 Drawing Figures

BARBECUE GRILL

BACKGROUND OF THE INVENTION

Koziol (U.S. Pat. No. 3,557,771, issued Jan. 26, 1971) shows a pedestal-mounted gas grill base with a domed cover. The interior of the base is formed with ledges 36 for supporting the grill rods at any of several heights. In this instance, the base is said to be made of aluminum and the rods 31, 32 are integrated into two unitary grids. The burner structure is not depicted.

Goss (U.S. Pat. No. 2,641,243, issued June 9, 1953) and Harff et al (U.S. Pat. No. 3,452,736, issued July 1, 1969) illustrate grills with two levels of support bars, a lower level for the heat-radiating bodies and an upper level for the food being grilled.

Roberts (U.S. Pat. No. 2,582,720, issued Jan. 15, 1952), Riedy (U.S. Pat. No. 2,690,171, issued Sept. 28, 1954), and Sazegar (3,276,440, issued Oct. 4, 1966) all illustrate housings for grills and the like made of ceramic material. In Harff et al, mentioned above, the lid 40 is made of glass. Laws, Jr. (U.S. Pat. No. 3,410,989, issued Nov. 12, 1968) and Howie (U.S. Pat. No. 3,869,596, issued Mar. 4, 1975) illustrate that it is known to make electric cookers out of pyroceram, e.g. "Corningware".

Current gas barbeques usually are manufactured of stamped steel, cast aluminum or cast iron. Stamped steel rusts very rapidly in actual use. Cast aluminum is very expensive and the aluminum "bleeds" through the exterior paint with exposure to weather which ruins the appearance of the unit. Cast iron also rusts, costs a great deal and is very expensive to ship. The major interior parts of a conventional grill consist of a burner made of cast iron, sheet metal or sheet stainless steel and two wire grids. One grid supports a layer of ceramic briquettes and the other is used as a cooking surface. Due to extremely high temperatures, corrosive cooking spices and frequent exposure to weather, all of these items require periodic replacement. This represents a substantial cost to the buyer.

SUMMARY OF THE INVENTION

The grill body is an integral member, preferably made of microcrystalline glass and formed with opposed series of corresponding pairs of upwardly opening saddles at each of two different intermediate levels in two opposed sidewalls. Each pair of saddles receives the opposite ends of a metal bar or the like, to provide two levels of support bars. Preferably, the support bars at each level are not interconnected by cross-bars so they may be removed, cleaned and even replaced individually. Particular gas burner and electric heating element constructions are illustrated.

In a preferred embodiment, the barbeque body is made of heat-resistant glass, such as the glass used for modern cookware and laboratory equipment. The burner in this unit is made as an integral part of the barbeque body. As the barbeque body and burner are manufactured in one operation, most of the production costs associated with the separate burner assembly are eliminated. The glass material is not so susceptible to corrosion and periodic burner replacement may not be necessary.

When the preferred individual rod-type supports are used, the cost of fabricating grids is eliminated and the user is free to remove, clean and replace the rods as individual units.

The ceramic or glass of the barbeque body can be made in pigmented form, to eliminate painting and most details can be molded in, thus eliminating many finishing steps that are required when grills are made of other materials.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION OF THE PRESENTLY PREFERRED EMBODIMENTS

Figure 1:
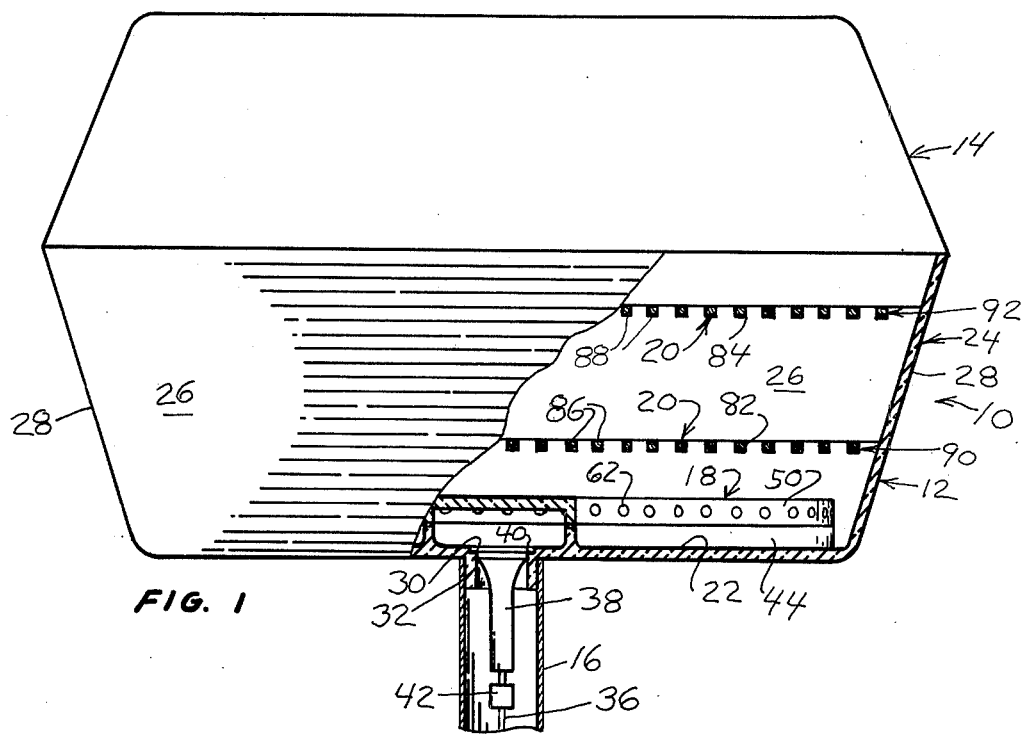
FIG. 1 is a side elevation view of the grill with part broken away and sectioned to show interior details.

The barbeque grill 10 includes a body 12, a removable cover 14, a support post 16, a burner or heating unit 18 and assemblages 20 of support bars.

The body 12 is a unitary structure preferably made in a unique form out of heat-resistant glass or ceramic material such as is used to make laboratory glassware, ovenproof cookware, microcrystalline glassware or pyrocyramic ware such as "Corningware" vessels, by the same techniques used to form those products.

As shown, the body 12 includes a generally horizontal bottom wall 22 with an upstanding outer peripheral sidewall 24 which includes opposed sides 26 and opposed ends 28. Although the body is shown being generally rectangular in figure, with upwardly lengthening trapezoidal sides and ends 26,28, that is not an essentiality.

The floor 22 is shown provided with a central opening 30 with a shoulder structure 32 which permits the body to be mounted on a post or standard 16 in substantially the same manner that conventional barbeque grills are supported.

When the grill 10 is a gas-fired one, the gas supply line 36 may ascend in the lumen of the post and serve as air/gas mixing venturi 38 which flares upwards and seats on a shoulder 40 in the opening 30.

A valve 42 is shown interposed in the line 36 to provide for cutting off and regulating the gas flow.

An integral burner base in the form of an upstanding flange 44 having the figure, in plan, of a tracing of the perimeter of an "H", is integrally formed on the floor 22. It is elongated parallel to the length of the sides 28 and centered upon the opening 30.

An upwardly opening groove 46 circuits the upper end 48 of the flange 44 intermediate the thickness of the end 48.

A burner top 50 is provided, preferably made of the same material as the body 12. The burner top 50 has the same size and figure as the burner base 44. It includes a generally flat top wall 52, with a depending peripheral skirt 54.

Figure 4:
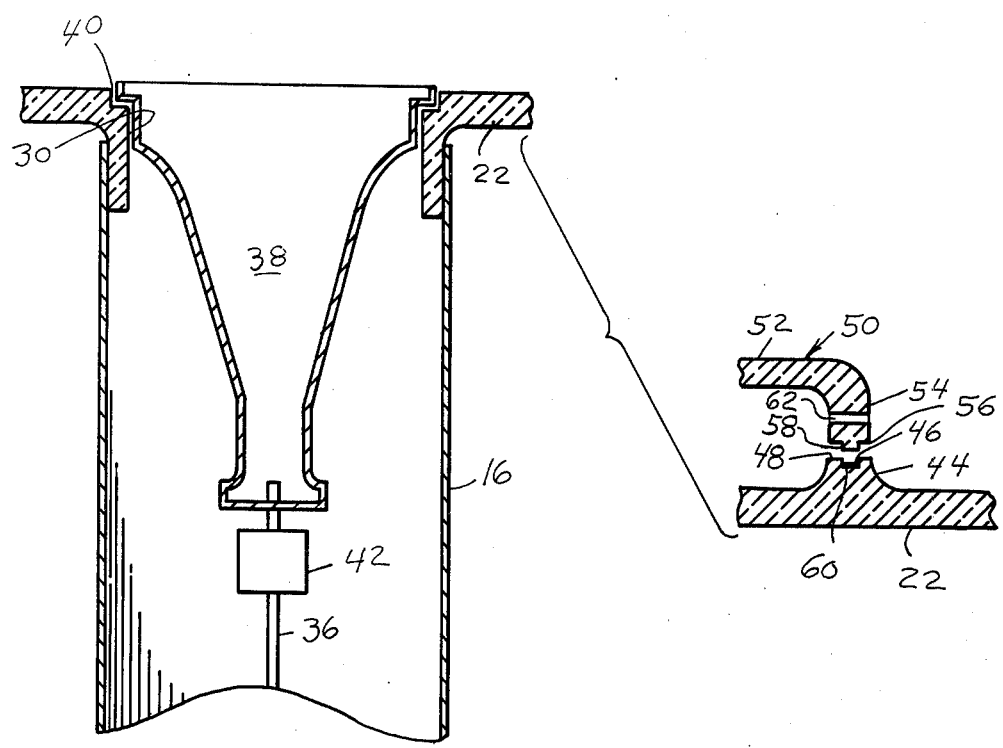
FIG. 4 is a fragmentary exploded transverse sectional view of a portion of the body and burner on a larger scale to illustrate one embodiment of the structure of this portion.
Figure 5:
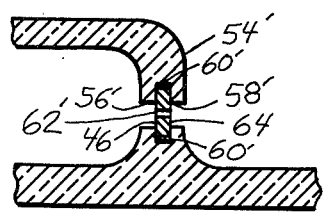
FIG. 5 is a view similar to FIG. 4, but of another embodiment.

In FIGS. 4 and 5, two ways in which the burner top may be mounted on the burner base are illustrated.

In FIG. 4, the lower end 56 of the skirt 54 is provided with a downwardly projecting rib 58 intermediate the thickness of the end 56. The rib 58 circuits the end surface 56 and is sized to interdigitate with the groove 46. A gasket 60 of asbestos or the like is shown interposed between the rib 58 and the flange 44 in the groove 46. The gasket 60 extends all the way along the groove 46. A series of perimetrically spaced openings 62 is provided through the thickness of the skirt 54 of the burner top to serve as burner portholes.

In FIG. 5, the lower end of the skirt 54' is provided with a downwardly opening groove 58' intermediate the thickness of the end. The groove 58' circuits the end surface 56'. An axially short band 64 of stainless steel or the like is interposed between the grooves 46 and 58' with one edge thereof received in each. Gaskets 60' are provided between each groove and the band 64. The band 64 and gaskets 60' extend all the way along the grooves 46 and 58'. A series of perimetrically spaced openings 62' is provided through the thickness of the band 64 to serve as burner portholes.

(The construction of FIG. 4 is preferred, as simpler, except in the instances where the constructional material or the conditions of use would cause excessive wearing and early failure at the sites of the burner portholes. In the FIG. 5 construction, the burner portholes are provided on a separately replaceable, but durable, band.)

Figure 6:
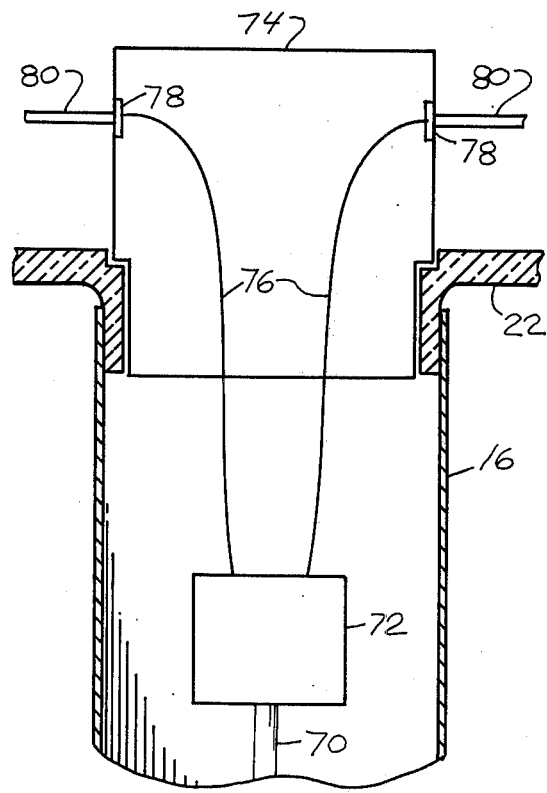
FIG. 6 is a fragmentary longitudinal sectional view of a modified form, in which the body is provided with an electric heating element.

In the embodiment illustrated in FIG. 6, the burner top and other components suited for a gas-fired grill are replaced by suitable components for electrical heating. For instance, the gas supply line is replaced by an electrical service cable 70, provided with a switch 72 (which may be of a conventional multiposition type) for regulating the amount of heating. The gas burner top is replaced by a ceramic cylinder 74, wired at 76 to the switch 72, and provided with conventional plug-in sockets 78 for plug-in electrical resistance coil heating units 80, such as are conventionally used in electric cooking ovens.

Figure 2:
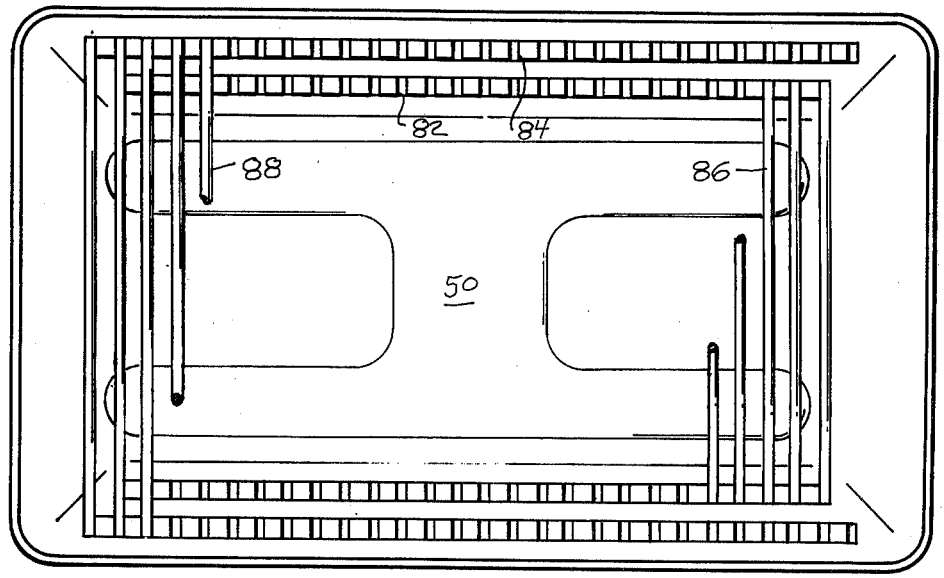
FIG. 2 is a top plan view with the cover removed.
Figure 3:
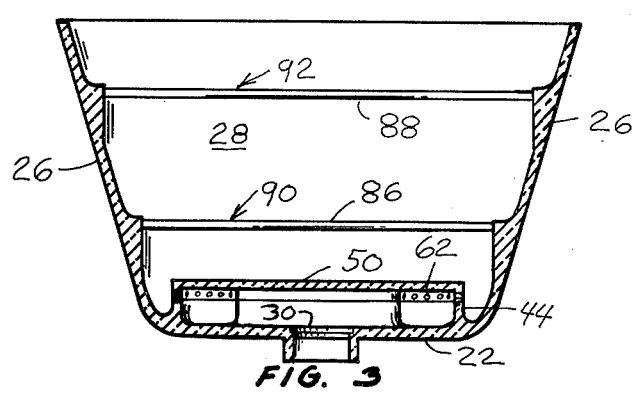
FIG. 3 is a transverse sectional view of the body.

Referring now to FIGS. 1–3, the grill body 12 is provided at a lower intermediate level with a first series of correspondingly opposed, upwardly opening, sockets or saddles 82 in the two sidewalls 24. The grill body 12 is further provided at an upper intermediate level with a second series of correspondingly opposed, upwardly opening sockets or saddles 84 in the two sidewalls 24.

Each two correspondingly opposed saddles 82 and each two correspondingly opposed saddles 84 constitutes a pair of saddles which are longitudinally aligned on a horizontal axis which extends orthogonally from one sidewall 24 to the other sidewall 24.

The saddles 82,84 are integrally molded in place during manufacture of the grill body 12.

There is also provided a plurality of shorter individual support bars 86 and a plurality of longer, individual support bars 88. The bars 86,88 may be made of stainless steel or of any material conventionally used to make barbeque grill support grids.

The bars 86 are sized to each seat at their opposite ends in a respective pair of saddles 82 and thus to be suspended above the gas or electrical heat source. When each pair of saddles 82 suspends a respective bar 86, there is thus constituted a first, lower intermediate support level 90.

The bars 88 are sized to each seat at their opposite ends in a respective pair of saddles 84 and thus to be suspended above the first level 90. When each pair of saddles 84 suspends a respective bar 88, there is thus constituted a second, upper intermediate support level 92.

In practice, the bars at the lower level 90 support a bed of discrete heat-radiating bodies such as conventional ceramic briquettes, and the bars at the upper level 92 support the food being grilled.

The grill shown is topped by a removable cover 14 structured much like a turkey roasting-pan cover. It may be made of the same or similar material as that used to make the grill body 12, or it may be made of other material, such as pressed or cast aluminum.

It should now be apparent that the barbeque grill as described hereinabove possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

I claim:
1. In a barbeque grill,
a body comprising:
an integral shell formed of heat-resistant glass and having a floor and an upstanding peripheral sidewall extending perimetrically of the floor;
opening means formed through the floor for accommodating a heating unit;
a gas burner base in the form of an integrally formed upstanding flange on the grill body floor extending in a complete circuit around the opening means through the grill floor;
said sidewall, at a lower intermediate level, having two corresponding series of upwardly opening saddles opposed to one another across the floor;
said sidewall, at an upper intermediate level, having two corresponding series of upwardly opening saddles opposed to one another across the floor;
whereby grill bars may be seated in corresponding twos of the saddles for suspension across the floor at said lower intermediate level for supporting heat radiating bodies, and at said upper intermediate level for supporting food to be grilled.

2. The barbeque grill article of claim 1 further comprising:
a plurality of individual, non-interconnected bars removably received in corresponding twos of said saddles at each of said levels.

3. The barbeque grill article of claim 2 further comprising:
a support post having a lumen;
means supporting the grill body on the support post with said opening means of the grill body floor vertically aligned with the post lumen;
an energy supply conduit rising through the support post lumen into said opening means of the grill body floor;
an energy supply cut-off and regulating valve interposed in the energy supply conduit;

a heating unit disposed in the grill body adjacent the floor in communication with the energy supply conduit; and means supporting the heating unit with respect to the grill body floor.

4. The barbeque grill of claim 3 wherein the heating unit comprises:

a gas burner top having a generally horizontal upper wall and an outer, peripheral depending skirt of substantially the same figure as said gas burner base flange;

heat-resistant sealing means;

the gas burner top skirt being supported upon said upstanding flange of the gas burner base with said heat-resistant sealing means interposed therebetween;

and gas porthole means formed through the gas burner top;

the energy supply conduit including a gas/air mixing venturi opening through said opening means of the grill body floor.

5. The barbeque grill of claim 4 wherein:

the gas burner top is integrally formed of heat-resistant glass.

6. The barbeque grill of claim 4 wherein:

the barbeque grill body and the glass burner top are each integrally formed of pyroceramic material.

7. The barbeque grill of claim 4 wherein:

the skirt of the gas burner top is formed in two parts, including an upper part that is integrally formed with the upper wall of the gas burner top, and a separate, lower part, interdigitated with the upper part of the skirt;

the gas portholes being formed through said lower part of the skirt, whereby the lower part of the skirt, containing the gas portholes may be replaced as a separate element.

8. The barbeque grill of claim 1 wherein:

the barbeque grill body is intergrally formed of pyroceramic material.

* * * * *